United States Patent
Joffe et al.

(10) Patent No.: US 9,380,152 B2
(45) Date of Patent: Jun. 28, 2016

(54) SYSTEMS AND METHODS FOR PROVIDING BACK POWER TO A SERVICE UNIT

(71) Applicants: Daniel M. Joffe, Owen Crossroads, AL (US); Jared D. Cress, Decatur, AL (US)

(72) Inventors: Daniel M. Joffe, Owen Crossroads, AL (US); Jared D. Cress, Decatur, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 14/659,014

(22) Filed: Mar. 16, 2015

(65) Prior Publication Data
US 2015/0264171 A1    Sep. 17, 2015

Related U.S. Application Data

(60) Provisional application No. 61/953,211, filed on Mar. 14, 2014.

(51) Int. Cl.
| | | |
|---|---|---|
| *H04M 1/24* | (2006.01) | |
| *H04M 3/08* | (2006.01) | |
| *H04M 3/22* | (2006.01) | |
| *H04M 3/26* | (2006.01) | |
| *H04M 7/00* | (2006.01) | |
| *H04M 19/00* | (2006.01) | |
| *H04M 19/08* | (2006.01) | |

(52) U.S. Cl.
CPC ............ *H04M 3/2209* (2013.01); *H04M 3/2272* (2013.01); *H04M 3/26* (2013.01); *H04M 7/0084* (2013.01); *H04M 19/001* (2013.01); *H04M 19/08* (2013.01)

(58) Field of Classification Search
CPC ...... H04B 10/25; H04B 20/27; H04B 10/806; H04B 10/808; H04B 19/08; H04M 11/066; H04M 19/08; H04M 1/738; H04M 3/22; H04J 14/0246; H04J 14/025; H04J 14/0282; H04L 2/10

USPC ............ 379/1.01, 1.03, 1.04, 9.06, 24, 27.01, 379/29.03, 29.04, 32.01, 32.04
See application file for complete search history.

(56) References Cited

U.S. PATENT DOCUMENTS

| | | | | |
|---|---|---|---|---|
| 6,665,404 | B2 * | 12/2003 | Cohen ................. | H02J 1/102 370/494 |
| 7,359,647 | B1 * | 4/2008 | Faria .................. | H02J 17/00 398/113 |
| 7,580,732 | B2 * | 8/2009 | Bailey ................ | H04M 1/738 370/216 |
| 7,672,591 | B2 * | 3/2010 | Soto ................... | H04B 10/808 398/66 |
| 8,107,618 | B2 * | 1/2012 | Binder ................ | H04M 19/08 379/387.01 |
| 8,411,696 | B1 | 4/2013 | Ko et al. | |
| 8,601,289 | B1 * | 12/2013 | Smith ................. | H04L 12/10 713/300 |
| 8,818,192 | B1 * | 8/2014 | Smith ................. | H04B 10/808 398/171 |
| 8,963,367 | B2 * | 2/2015 | Melamed ............ | H04L 12/10 307/18 |
| 9,001,974 | B2 * | 4/2015 | Humphrey .......... | H04M 1/738 379/30 |

(Continued)

*Primary Examiner* — Binh Tieu
(74) *Attorney, Agent, or Firm* — Maynard Cooper & Gale, P.C.; Jon E. Holland

(57) ABSTRACT

A combination of algorithms and circuits are used to combine POTS, high-speed bi-directional data, and back-powering onto the drop connection for fiber to the distribution point architectures. A telephone adapter device can be utilized to prevent damage from back-powering occurring at POTS telephones connected to the drop connection. In addition, circuits are used to prevent damage from back-powering occurring at POTS telephones directly connected to the drop connection. A circuit is used to provide more consistent power to the electronics at the distribution point even when the input back-power to the distribution point may fluctuate.

23 Claims, 6 Drawing Sheets

(56) References Cited

U.S. PATENT DOCUMENTS

| | | | |
|---|---|---|---|
| 2006/0203997 A1* | 9/2006 | Bailey | H04M 1/738 379/413 |
| 2007/0116256 A1 | 5/2007 | Ponganis et al. | |
| 2010/0150556 A1 | 6/2010 | Soto et al. | |
| 2012/0250840 A1 | 10/2012 | Joffe et al. | |
| 2012/0300817 A1 | 11/2012 | Smith et al. | |
| 2013/0251114 A1* | 9/2013 | Humphrey | H04M 1/738 379/30 |
| 2014/0050227 A1 | 2/2014 | Goodson et al. | |
| 2015/0078756 A1* | 3/2015 | Soto | H04B 10/808 398/116 |

* cited by examiner

SYSTEMS AND METHODS FOR PROVIDING BACK POWER TO A SERVICE UNIT

CROSS-REFERENCE TO RELATED APPLICATIONS

This application claims the benefit of U.S. Provisional Application No. 61/953,211, entitled "Combining POTS, High-speed Data, and Back-Powering on a Single Pair of Wires for Fiber to the Distribution Point (FTTdp) Architectures," filed Mar. 14, 2014, which application is hereby incorporated by reference in its entirety.

BACKGROUND

Network service providers want to cost effectively satisfy customer demand for high-speed data. One way to provide customers with high-speed data is through the use of a fiber optic connection. A Fiber to the Distribution Point (FTTDP) connection can provide a more cost effective alternative for providing high-speed data services to customers than a Fiber to the Home (FTTH) connection. In an FTTDP architecture, an optical termination unit is placed close to the customer, e.g., at a distribution point, and then one or more existing very short metallic drop wires to the customer are reused. Reuse of the existing drop wires eliminates a significant component of fiber optic cable and fiber installation cost that would be present with an FTTH connection. As the connection between the optical termination unit and the customer premises is short, very high-speed data can be carried with inexpensive, low power hardware.

For example, in DSL (digital subscriber line) systems, it is generally desirable for the DSL connection to be as short as possible in order to enhance speed and performance. One option for obtaining a short DSL connection involves placing the DSL modems connected to the network at distribution points. A distribution point might typically be located at the top of a telephone pole or at a pedestal located on the ground within a few hundred feet of the customer premises. A number of drop connections, e.g., telephone lines, can fan out from the distribution point with each drop connection heading towards a different customer premises.

One problem with placing the DSL modem at the distribution point is that the DSL modem and the other components at the distribution point may have difficulty obtaining a reliable power supply from the immediate vicinity of the distribution point. One solution to this problem involves supplying power to the distribution point from equipment at the customer premises using the drop connection that carries the DSL signals.

However, there can be problems with providing power from customer premises equipment to the components located at the distribution point. The customer premises equipment has to provide a significant amount of power to adequately power all of the components at the distribution point. The large amount of power provided by the customer premises equipment to the distribution point can damage other equipment connected to the drop connection. In addition, the power provided to the distribution point by the customer premises equipment is DC power and can be affected by other low frequency signals, e.g., a ringing signal, on the drop connection. The other low frequency signals on the drop connection can significantly impact the DC power from the customer premises equipment such that the components at the distribution point do not receive enough power to ensure proper operation of the components.

Therefore, what is needed are systems and methods to consistently provide power from customer premises equipment to components at the distribution point over the drop connection without damaging other components that may be connected to the drop connection.

SUMMARY

The present application generally pertains to systems and methods for providing high-speed (e.g., near-gigabit) data service (HSDS) with compatible POTS (plain old telephone service) utilizing back powering from the equipment at the customer premises to supply equipment at a distribution point located outside of the customer premises. The high-speed data service operates over a high-speed data connection, such as a digital subscriber line (DSL) connection operating in accordance with one of the very high-speed DSL (VDSL) standards, including G.fast technology.

One advantage of the present application is that telephones directly connected to the drop connection are not damaged by back power provided on the drop connection for the distribution point.

Another advantage of the present application is that the distribution point can remain powered even during fluctuations in the back power voltage caused by a ringing signal on the drop connection.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
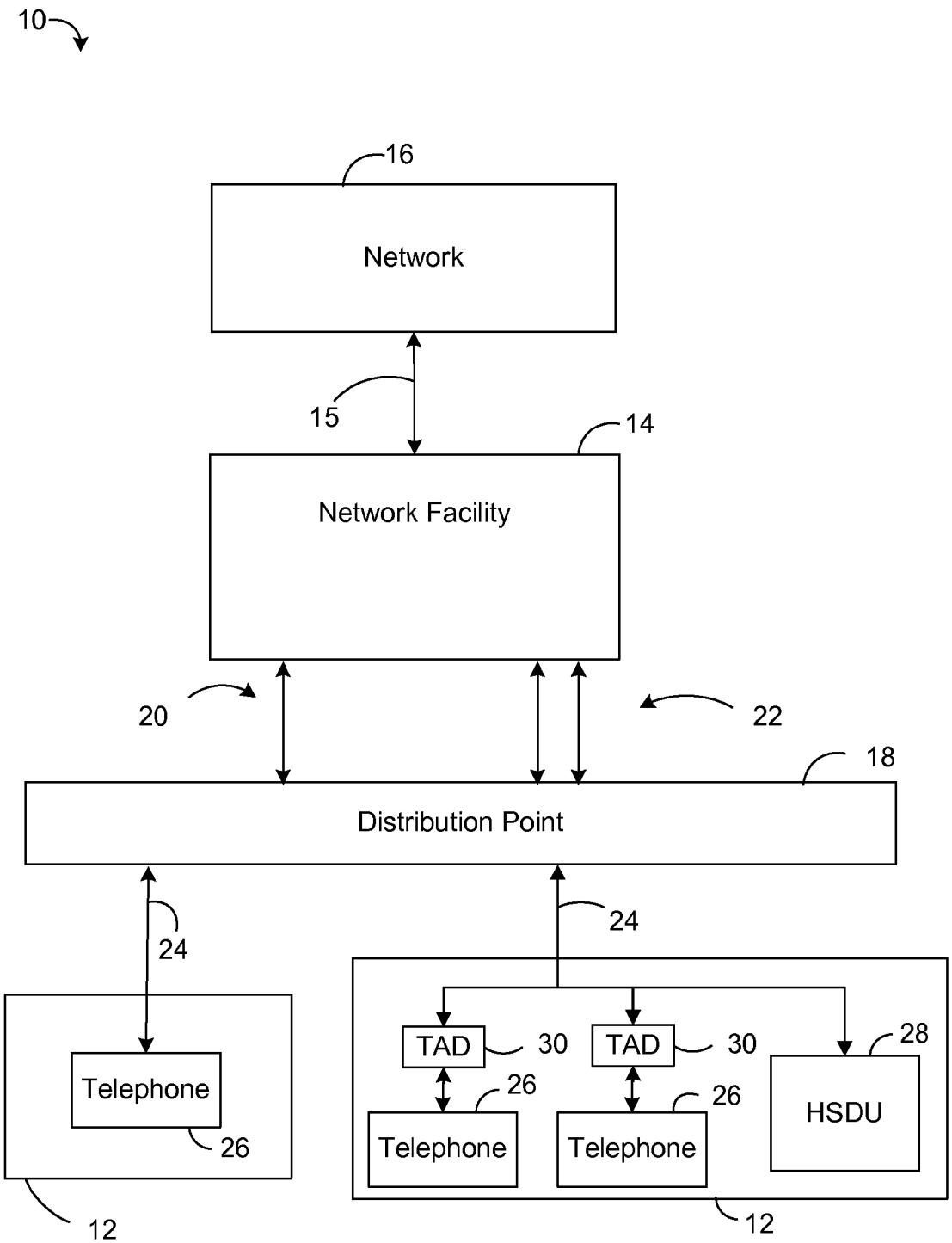
FIG. 1 is a block diagram showing an embodiment of a telecommunication system.

FIG. 1 shows a system 10 for communicating data and voice between several customer premises 12 and at least one network 16. The network 16 can include any of various types of telecommunication networks, such as the public switched telephone network (PSTN). The at least one network 16 can be connected to a network facility 14, such as a central office, by one or more connections 15. The network facility 14 can be connected to a distribution point (DP) 18 by at least one high-speed data connection 20, e.g., an optical fiber, and multiple POTS (plain old telephone service) lines 22. The high-speed data connection 20 provides a high-speed channel that carries a data stream between the DP 18 and the network facility 14. The POTS lines 22 provide voice channels between the DP 18 and the network facility 14. In one embodiment, there can be a POTS line 22 for each customer premise 12 connected to the DP 18. However, in other embodiments, the number of POTS lines 22 and the number of customer premises 12 connected to the DP 18 may be different. Further, while the embodiment in FIG. 1 shows one DP 18 connected to the network facility 14 and two customer premises 12 connected to the DP 18, more than one DP 18 can be connected to the network facility 14 and more or less than two customer premises 12 can be connected to a DP 18.

The DP 18 is connected to one or more customer premises 12 via at least one conductive connection 24, such as a twisted-wire pair. The physical or conductive connection 24 from the DP 18 to a customer premise 12 is referred to as a "drop connection." The drop connection 24 at the customer premises 12 can be connected to one or more customer premises equipment (CPE), such as a telephone 26, a high-speed data unit (HSDU) 28, a fax machine, etc., located at the customer premise 12.

When a customer wants to obtain high-speed data service (HSDS), which may or may not include voice service, a user, e.g., a customer or a technician, connects the HSDU 28 to the drop connection 24. In addition, if the customer is receiving voice service with HSDS, a telephone adapter device (TAD) 30 is connected by the user between each telephone 26 (or any other device, e.g., a fax machine, expecting a POTS signal on the drop connection 24) at the customer premises 12 and the drop connection 24. The TAD 30 is a passive device that permits a standard POTS telephone or other POTS device to work in conjunction with the HSDU 28. If a customer is not using a HSDU 28 then a TAD 30 does not have to be connected between the telephone 26 and the drop connection 24 since only a POTS signal is provided on the drop connection 24.

The TAD 30 is used to prevent damage to the telephone 26 that may occur as a result of an excessive current being received by the telephone 26 during operation of the HSDU 28, more specifically, the providing of back power by the HSDU 28. The TAD 30 can have a passive splitter or filter to separate the POTS voice signal from the HSDS signal and current limiters (that may or may not contain voice-band bypasses) to limit the current provided to the telephone 26. The TAD 30 can include resistors to limit the current to the telephone 26 to about 25 mA (milliAmperes) when the telephone 26 is in the off-hook state even though the open circuit line voltage at the telephone 26 can be more than 50 V (volts). The TAD 30 can have low-pass filters to minimize the interference of signaling transients into the data path and isolate the telephone 26 from the high-speed data being sent and received by the HSDU 28.

Figure 2:
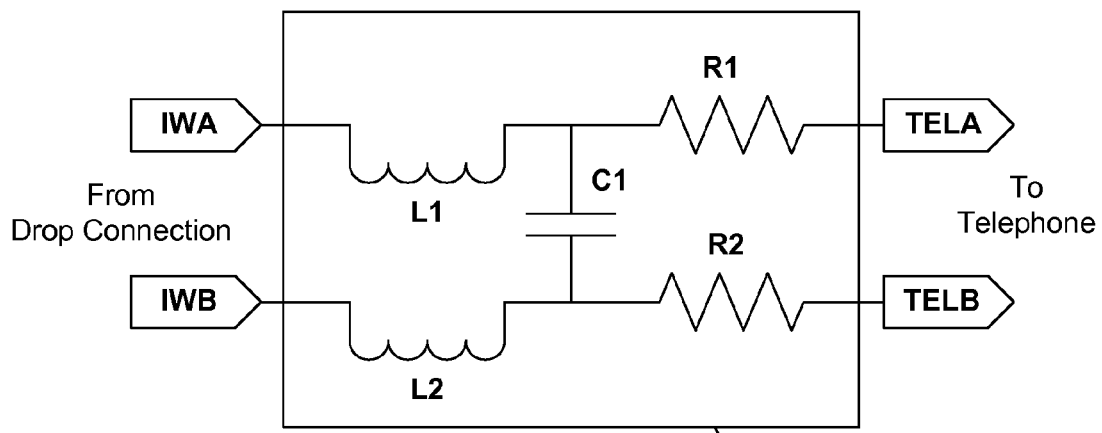
FIG. 2 is a schematic diagram of an embodiment of a telephone adapter device from the telecommunication system of FIG. 1.

FIG. 2 shows a schematic diagram of a TAD 30. The TAD 30 has connection ports coupled to the drop connection 24 and a POTS telephone 26. In one embodiment, the connection ports for the TAD can be receptacles to receive corresponding plugs connected to wiring for the drop connection 24 and wiring for the telephone 26. The TAD 30 has input wires IWA and IWB connected to the port for the drop connection 24 and output wires TELA and TELB connected to the port for the telephone 26. IWA can be connected to TELA by a series connected inductor L1 and resistor R1 and IWB can be connected to TELB by a series connected inductor L2 and resistor R2. A capacitor C1 can be connected in parallel between L1 and R1 and between L2 and R2, as shown in FIG. 2. The inductors L1 and L2, the resistors R1 and R2 and the capacitor C1 can be appropriately sized to provide the desired current limiting and filtering functions of the TAD 30. In one embodiment, inductors L1 and L2 can be 0.5 milliHenries (mH), the resistors R1 and R2 can be 850 ohms (0) and the capacitor C1 can be 22 nanoFarads (nF).

Figure 3:
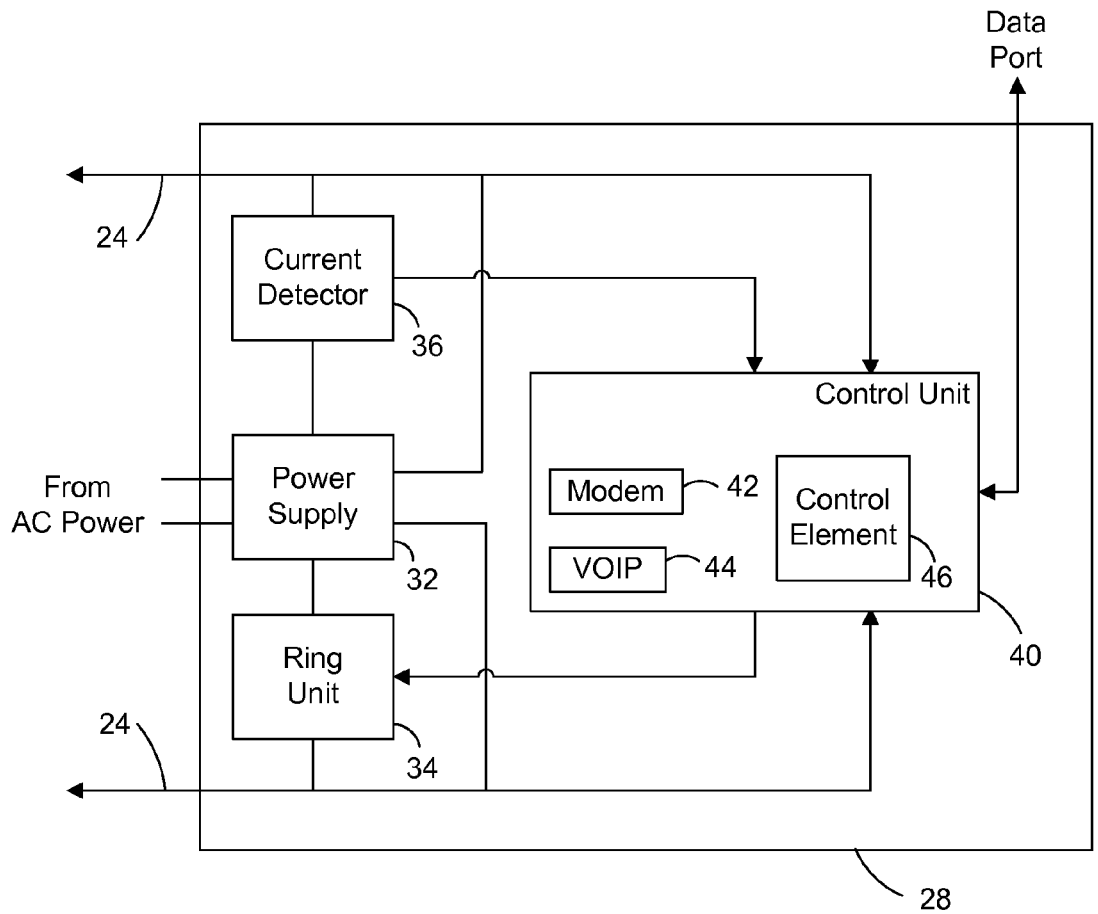
FIG. 3 is a block diagram showing an embodiment of an HSDU from the telecommunication system of FIG. 1.

FIG. 3 is a block diagram showing an embodiment of the HSDU 28. The HSDU 28 is connected to the drop connection 24 and to an AC (alternating current) power source by the user installing the HSDU 28 at the customer premises 12. A power supply 32 receives an AC voltage from the AC power source and converts the AC voltage to a DC (direct current) voltage. In other embodiments, the power supply may be coupled to a DC power source (not shown). The power supply 32 provides a power signal (e.g., a DC voltage) to the drop connection 24 to power the components of the distribution point 18, which process is referred to as "back powering." In one embodiment, the DC voltage provided by the power supply 32 can range between 50 V (volts) and 55 V and is limited to a maximum of 60 V to comply with safety extra low voltage (SELV) requirements.

The HSDU 28 also includes a control unit 40 connected to the drop connection 24 to manage the high-speed data and the voice data (if the customer is receiving voice service) provided over the drop connection 24 to the HSDU 28. The control unit 40 can include a modem 42 to send and receive the high-speed data and voice data using the drop connection 24. The voice data can be processed by a VOIP (voice over IP (internet protocol)) unit 44 that converts the digital voice data from the modem 42 to analog voice data that is sent to the telephones 26 over the drop connection 24. The VOIP unit 44 can also receive analog voice data from the telephones 26 over the drop connection 24 and convert the analog voice data to digital voice data that is provided to the modem 42 for inclusion in the data stream. The VOIP unit 44 can also be used to activate the ring unit 34 when a ringing activation signal is included in the voice data. The ring unit 34 can place a 55 V RMS (root mean square), 20 Hz (hertz) ringing signal on the drop connection 24 to initiate the ringing process in the telephone(s) 26.

The HSDU 28 includes a control element 46 that can be used to filter or separate the high-speed data from the voice data. In one embodiment, the voice data can be provided in the data stream at a frequency of about 3 or 4 kHz or less and the high-speed data can be provided in the data stream at a frequency of about 1 MHz or greater. The high-speed data can be provided to a data port in the HSDU 28 and the voice data can be provided to the VOIP unit 44. In one embodiment, the data port can include an Ethernet connection. The HSDU 28 can also include a current detector 36 to measure the current being drawn on the power supply 32 (referred to as the IDU) or another parameter equivalent to the current drawn on the power supply 32.

Figure 4:
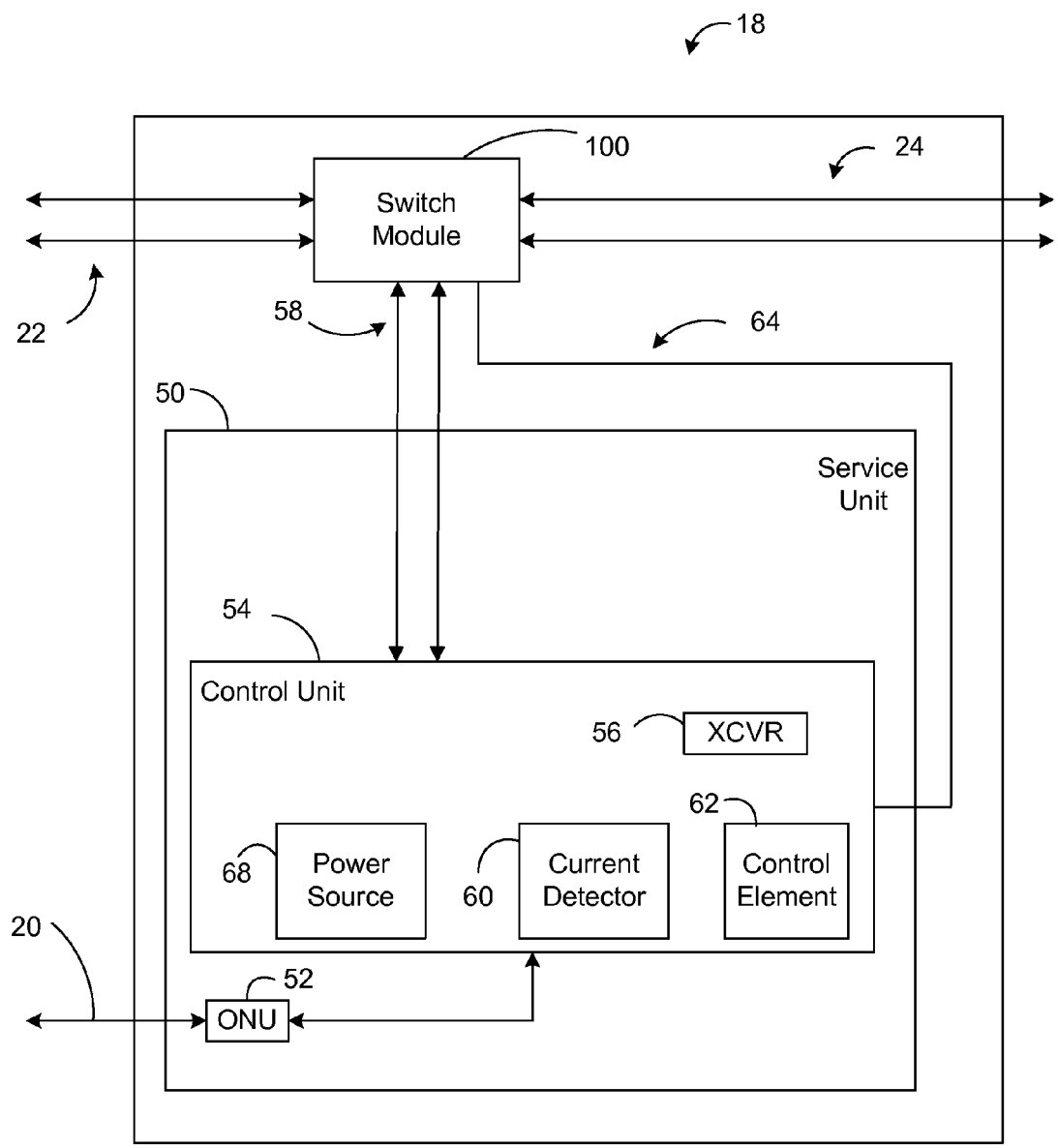
FIG. 4 is a block diagram showing an embodiment of the distribution point from the telecommunication system of FIG. 1.

FIG. 4 shows an embodiment of the DP 18 that is used to provide voice (telephone) and/or high-speed data to customer premises 12. The DP 18 does not have a dedicated connection to a power supply located in the vicinity of the DP 18, such as a battery or a line connection to an electric utility. The DP 18 can include a service unit 50 that is connected to the high-speed data connection 20. The service unit 50 can process data in both the downstream and upstream directions. In the downstream direction, the service unit 50 receives a high-speed data signal from the network 16 and de-multiplexes the data for transmission across a plurality of drop connections. In the upstream direction, the service unit 50 receives a plurality of data streams from a plurality of drop connections and multiplexes the data into a high-speed data signal for transmission to network 16.

The service unit 50 can include an optical network unit (ONU) 52 that can receive at least one packet flow from the high-speed data connection 20 and convert the received packet flow(s) from the optical domain to the electrical domain. The converted packet flow(s) can then be forwarded to control unit 54 and then sent to the customer premises 12 using a transceiver (XCVR) 56. The transceiver 56 can communicate using DSL (digital subscriber line) protocols, e.g., asymmetric DSL (ADSL), high-bit-rate DSL (HDSL), very-high-bit-rate DSL (VDSL), VDSL2, or G.fast, or other known protocols. The control unit 54 can include a control element 62 that is configured to forward the data packets of the high-speed data stream from the ONU 52 to the transceiver 56 based on the destination addresses in the data packets such that each data packet is ultimately received by the HSDU 28 corresponding to the packet's destination address.

The transceiver 56 can use output line 58 to connect to a switch module 100. The switch module 100 can also be connected to a POTS line 22 and drop connection 24. The switch module 100 can be configured to selectively connect the drop connection 24 to either the POTS line 22 (if the customer has requested only telephone service) or the high-speed data service (HSDS) output line 58 connected to transceiver 56 (if the customer has requested high-speed data service that may or may not include telephone service). While the switch module 100 in FIG. 4 is shown separate from service unit 50, the switch module 100 can be incorporated into the service unit 50 in another embodiment.

In one embodiment, the DP 18 can include a switch module 100 for each POTS line 22 connected to the DP 18. When the DP 18 has more than one switch module 100, the service unit 50 can include multiple transceivers 56 and output lines 58. Each switch module 100 can be connected to a POTS line 22 and an output line 58 and transceiver 56.

The control unit 54 can include a power source 68 that receives the DC voltage from the power supply 32 over the drop connection 24 and output line 58. The power source 68 can use the DC voltage from the power supply 32 to provide power to the components of the service unit 50 and/or switch module 100. In one embodiment, the power source 68 can provide 5 V, 3.3 V, 1 V, etc. to the components of the service unit 50 and/or switch module 100. A current detector 60 can measure the current used by the service unit 50 or another parameter equivalent to the current used by the service unit 50. The current detector 60 can provide the measured current for the service unit 50 (referred to as the ISU) or other parameter equivalent to the measured current for the service unit 50 to a control element 62 that can forward the measured current or other parameter over the output line 58 and the drop connection 24, i.e., a powering data link (PDL), to the control unit 40 (FIG. 3) in the HSDU 28. In one embodiment, the PDL can be part of the high-speed data communicated over the drop connection 24. The control element 62 can also be used to provide a control signal to the switch module 100 over line 64.

The ISU is provided over the PDL to the control unit 40 in the HSDU 28. The control unit 40 subtracts the ISU value from the IDU value and makes control decisions based on the difference between the IDU value and the ISU value. In other embodiments, other comparisons or analysis of the IDU value, ISU value or the other parameters equivalent to the IDU and ISU can be performed and used as the basis for making control decisions. For example, a ratio of the IDU and ISU values can be compared to a threshold ratio and control decisions based on whether the IDU and ISU ratio is greater than or less than the threshold ratio.

In one embodiment, the control unit 40 can determine if a telephone 26 connected through a TAD 30 is in the off-hook state by determining if the IDU-ISU difference value is greater than a predetermined current value, e.g., 10 mA. If an off-hook state for a telephone 26 using a TAD 30 is determined by the control unit 40, a signal is provided to the VOIP unit 44 to initiate further processing by the VOIP unit 44. In another example, if the VOIP unit 44 has instructed the ring unit 34 to place a ringing signal on the drop connection 24, the off-hook state can be determined as described previously and the ringing signal can be terminated by the VOIP unit 44 in response to the determination of the off-hook state in the telephone 26 using the TAD 30.

In another embodiment, the control unit 40 can use the IDU-ISU difference value to determine if a fault condition exists that can result in a telephone 26 receiving an excessive current that can damage the telephone 26. One example of a fault condition is a telephone 26 being connected directly to the drop connection 24, i.e., there is no TAD 30 connected between the telephone 26 and the drop connection 24, and entering the off-hook state, which would result in the telephone 26 receiving an excessive current. If the IDU-ISU difference value is greater than a predetermined current value, e.g., 150 mA, then a fault condition is present and the control unit 40 can instruct the power supply 32 to stop supplying the DC voltage to the drop connection 24. Alternatively, the control unit 40 can deactivate or disengage the power supply 32 when a fault condition is present. The predetermined current value used for fault detection can be selected such that a predetermined number of telephones 26 using TADs 30, e.g., 5 telephones 26 using TADs 30, can be in the off-hook state without triggering a fault condition. In one embodiment, the current measurements (IDU and ISU) are conducted at a sufficiently high rate to detect the off-hook state even during polarity reversals in the ringing signal provided by ring unit 30. In another embodiment, the current measurements (IDU and ISU) are filtered sufficiently, e.g., averaged, to avoid the impact of transient conditions on the current measurements.

After the fault condition is detected, the HSDU 28 can enter a pre-power-up state. The HSDU 28 can also be in the pre-power-up state immediately after the switch module 100 connects the drop connection 24 to the HSDS output line 58. The pre-power-up state can be used to avoid damage to or from the HSDU 28 if there are short circuits or foreign potentials on the drop connection 24 and to avoid damaging a telephone 26 directly connected to the drop connection 24. The output voltage from the HSDU 28 is approximately zero in the pre-power up state. If foreign potentials are at acceptable levels, then the HSDU 28 begins the power-up process.

In the power-up process, the HSDU 28 controls the power supply 32 to place a current limited 10 Volts (e.g., less than 40 mA) on the drop connection 24. The service unit 50 has an under-voltage lock-out that keeps the service unit 50 from drawing more than 1 mA for input voltages from the power supply 32 of less than 18 V. If the HSDU 28 delivers less than a predetermined amount of current, e.g., 10 mA, during the power-up process, then the HSDU 28 transitions to an idle state and begins supplying the DC voltage, i.e., the back power voltage, to the drop connection 24 with the power supply 32. If more than the predetermined amount of current is delivered by the HSDU 28, such as by having a telephone 26 connected directly to the drop connection 24 in the off-hook state, which can draw more than 100 mA of current, the HSDU 28 detects the over-current, instructs the power supply 32 to stop supplying DC voltage to the drop connection 24, imposes a predetermined time delay, and enters the pre-power-up state.

Figure 5:
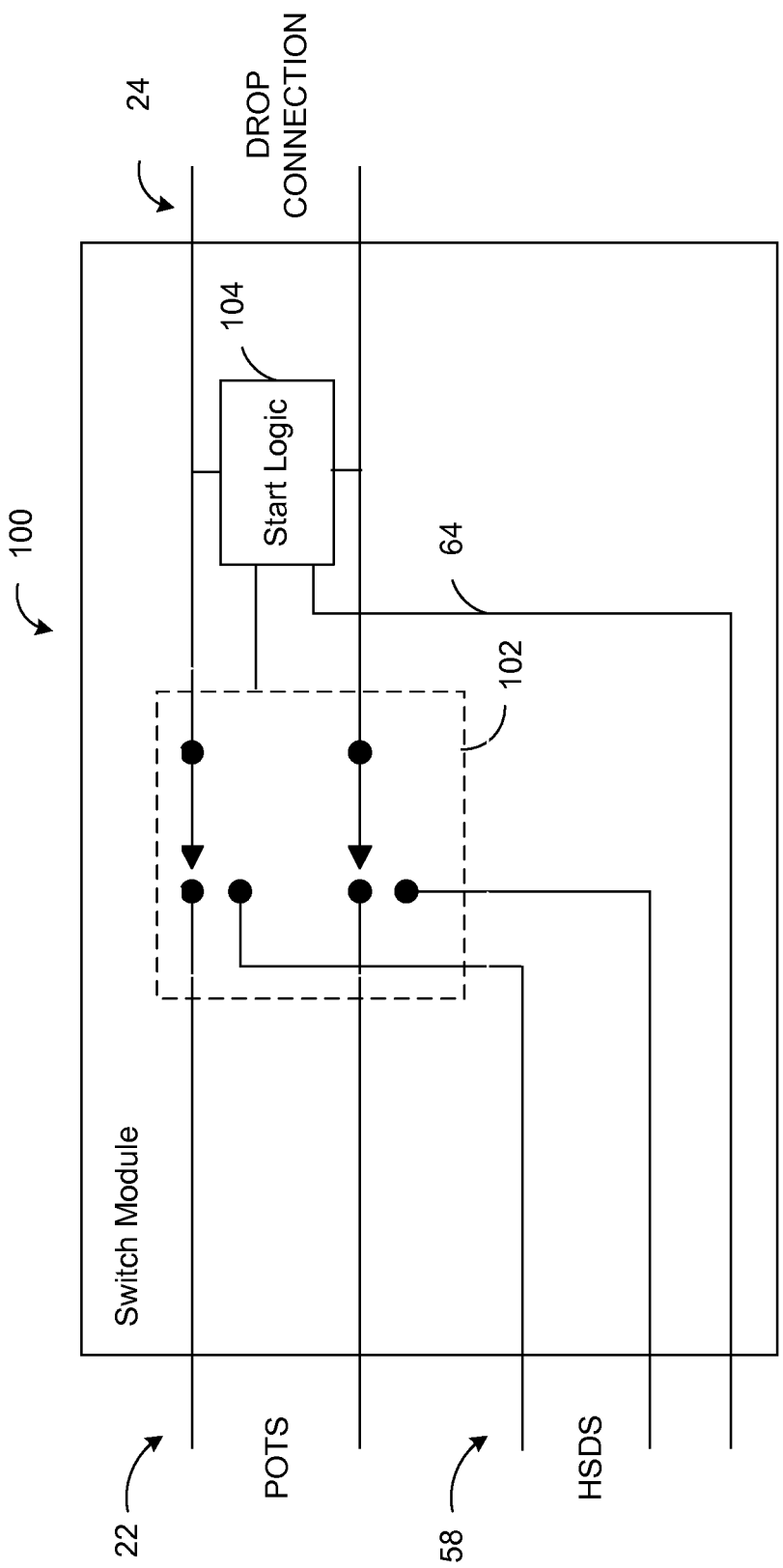
FIG. 5 is a schematic diagram showing an embodiment of the switch module from the distribution point of FIG. 4.

FIG. 5 shows an embodiment of a switch module 100 used to switch the connectivity of the drop connection 24 between POTS service and high-speed data service (HSDS). The switch module 100 can include a latching relay 102 to connect the drop connection 24 to either the POTS line 22 or the HSDS output line 58. The latching relay 102 can include a first port to connect to the drop connection 24, a second port to connect to the POTS line 22 and a third port to connect to the HSDS output line 58. In a first state of the latching relay 102, a first coil in the latching relay 102 can be energized to connect the drop connection 24 to the HSDS output line 58. In a second state of the latching relay 102, a second coil in the latching relay 102 can be energized to connect the drop connection 24 to POTS line 22. Starting logic 104 can be connected between the wires of the drop connection 24 and used to energize the first coil or the second coil depending on the desired state for the latching relay 102. In addition, the starting logic 104 is connected to line 64 and receives and processes the control signal sent on line 64 to the control unit 54. In one embodiment, the control signal from the control unit 54 can be used to prevent the starting logic 104 from switching the latching relay 102 to the second state from the first state. In another embodiment, the HSDU 28 can send an activation signal to the starting logic 104, instructing the starting logic 104 to switch the latching relay 102 from the second state to the first state to connect the drop connection 24 to the HSDS line 58 instead of the POTS line 22.

Figure 6:
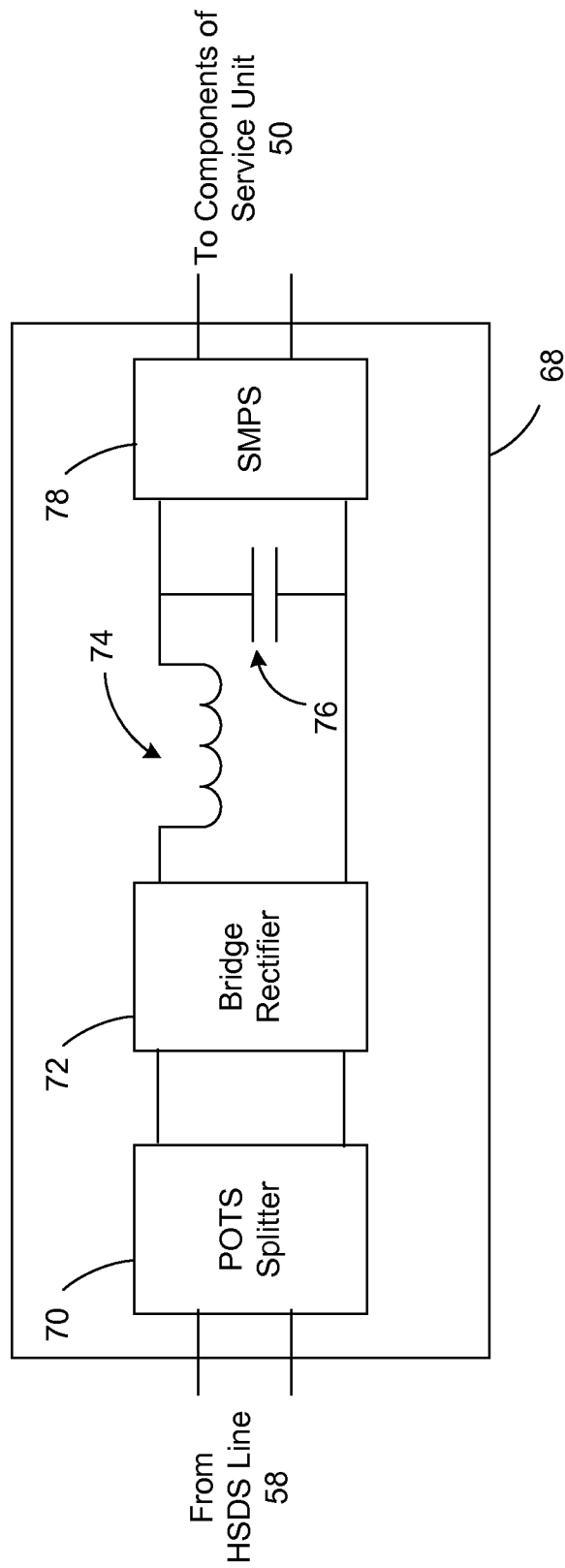
FIG. 6 is a block diagram showing an embodiment of the power source from the distribution point of FIG. 4.

FIG. 6 is a block diagram showing the power source 68. The power source 68 can receive the DC voltage from the power supply 32 (FIG. 3) over output line 58. The power source 68 can include a POTS splitter 70 to isolate or separate the power and voice signals from the high-speed data signals. In one embodiment, the voice signals can be at a frequency as low as about 300 Hz. The power and voice signals from the POTS splitter 70 are provided to a bridge rectifier 72. The bridge rectifier 72 outputs the absolute value of the input voltage, i.e., outputs only positive voltages. The output of the bridge rectifier 72 is provided to a non-linear inductor 74 and capacitor 76 before reaching the SMPS (switched mode power supply) 78. The SMPS 78 can include a switching regulator to control the output voltage and current characteristics provided to loads, e.g., the components of the service unit 50 and switch module 100, connected to the SMPS 78.

In one embodiment, the bridge rectifier 72 can provide the DC voltage, e.g., 55 V, from the power supply 32 on the drop connection 24 to the non-linear inductor 74 and capacitor 76. However, when a ringing activation signal is received by the VOIP unit 44, the VOIP unit 44 instructs the ring unit 34 to place a sinusoidal ringing signal, e.g., a 20 Hz, 55 V RMS signal, on the drop connection 24. The aggregate voltage of the DC voltage, e.g., 55 V, and the ringing voltage, e.g., 55 V RMS, received by the bridge rectifier 72 can vary between a maximum, e.g., 133 V, and a minimum, e.g., −23 V, generated from adding the DC voltage and the maximum and minimum ringing voltages. The variance in aggregate voltage received by the bridge rectifier 72 caused by the overlay of the ringing signal voltage on the DC voltage can result in the voltage from the bridge rectifier 72 being less than the expected DC voltage, i.e., the expected back power voltage, for a portion of the time. To prevent the SMPS 78 from not having enough power during the portion of the time that the voltage from the bridge rectifier 72 is less than the expected DC voltage, the non-linear inductor 74 changes inductance to permit more current to the capacitor 76 thereby permitting the capacitor 76 to store additional charge and voltage during high voltage periods, i.e., the portions of time where the voltage to the bridge rectifier 72 is greater than the expected DC voltage. The capacitor 76 can then discharge the additional charge and voltage acquired during the high voltage periods when the voltage to the bridge rectifier 72 is less than the expected back power voltage. In one embodiment, the non-linear inductor 74 can be used to isolate the capacitor 76 and the SMPS 78 from variances in the voltage from the bridge rectifier 72.

Figure 7:
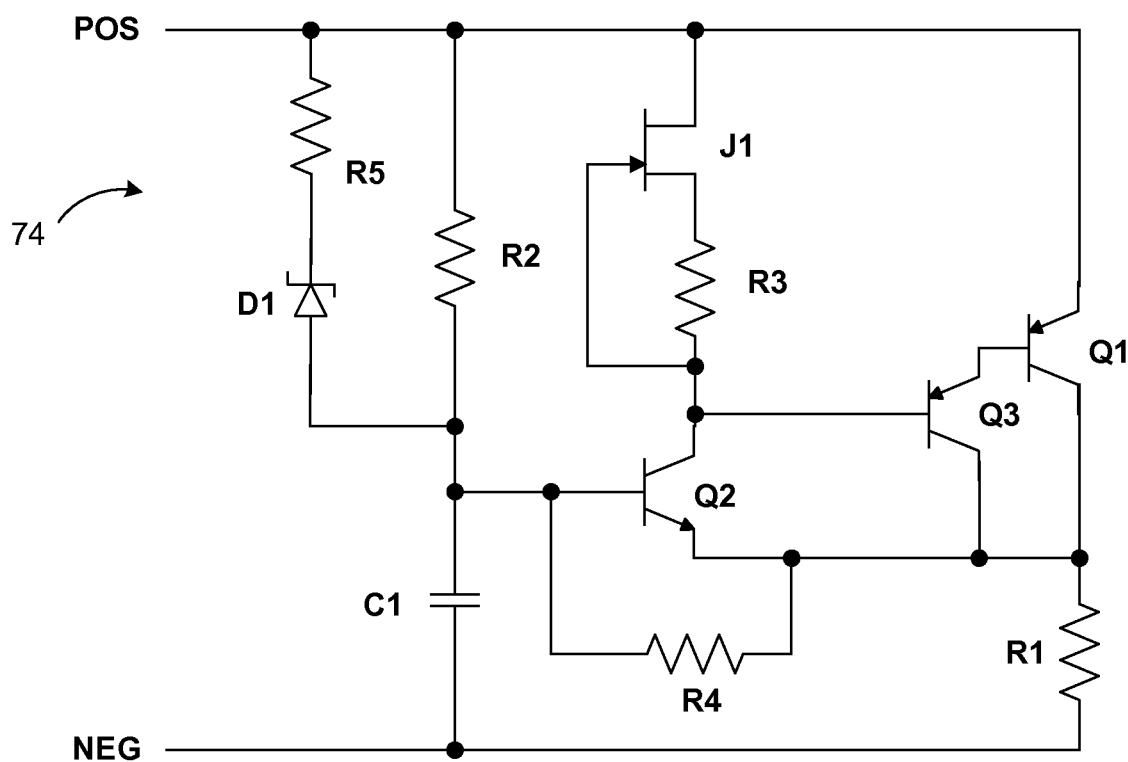
FIG. 7 is a schematic diagram of an embodiment of the non-linear inductor of the power source of FIG. 6.

FIG. 7 is a schematic diagram of an embodiment of the non-linear inductor 74. In one embodiment, the non-linear inductor 74 can have an impedance of 9500Ω in the voice band, an apparent inductance of 3 H, a voltage drop across the active portion of the non-linear inductor 74 (which includes all of the components shown in FIG. 7 but R1) of 3.35 V at room temperature and 330 mA of current, an equivalent series resistance of 5Ω, and the ability to withstand 2.88 volts peak-to-peak with low distortion. In the embodiment shown in FIG. 7, R1 can be 5Ω, R2 can be 40,000Ω, R3 can be 1,000Ω, R4 can be 10,000Ω, R5 can be 1,000Ω, C1 can be 15 pF, D1 can be a Zener diode, J1 can be a junction field-effect transistor (JFET), Q1 can be a PNP power transistor, Q2 can be NPN switching transistor, and Q3 can be a PNP switching transistor. However, in other embodiments other suitable components having different characteristics can be used.

In the non-linear inductor 74 shown in FIGS. 7, J1 and R3 form a current source to provide loop gain to the amplifier formed from the Q2, Q3 and Q1 transistors since R1 has low resistance. Without the J1 and R3 current source, the impedance of the non-linear inductor 74 would be too low and would short out the signals in the voice band. In addition, D1 and R5 can be a saturation element that provides a useful saturation behavior that keeps the power source 68 powered up during ringing, i.e., a ringing signal is present on the drop connection 24. D1 and R5 lower the inductance of the non-linear inductor 74 by a factor of 1+R2/R5 for large voltage increases across the non-linear inductor 74. The reduction in inductance of the non-linear inductor 74 permits the current through the non-linear inductor 74 to increase and increase the voltage on the capacitor 76. If there is no change in the inductance, the current and the charge on the capacitor 76 would remain at the same level as when there is no ringing signal present, i.e., only the DC voltage is present. The "extra" voltage on the capacitor 76 obtained when the aggregate voltage is greater than the expected DC voltage can then be used when the aggregate voltage drops below the expected DC voltage.

In another embodiment, an alternate solution to the problem of the voltage being below the expected DC voltage would be to use a square wave ringing signal instead of a sinusoidal ringing signal to decrease the dwell time of the composite waveform below the expected DC voltage.

In one embodiment, the TAD 30 can be an active device that includes the appropriate circuitry, e.g., the VOIP unit 44, to receive and process the voice signals included as part of the high-speed data stream on the drop connection 24. In addition, if the TAD 30 is an active device, the ringing activation signal included as part of the voice data may be processed at the TAD 30 and the ringing signal for the telephone 26 can be sent directly to the telephone 26 from TAD 30, i.e., there is no ringing signal on the drop connection 24. In another embodiment, capacitors can be included to shunt R1 and R2 to decrease the insertion loss from the TAD 30.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

In various embodiments described above, a service unit is shown as residing at a distribution point. In other embodiments, any of the service units described herein may reside at other locations. For example, a service unit may be mounted on a side of the house in which the HSDU 28 is situated.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A telecommunication system comprising:
   a data unit located at a customer premises, the data unit coupled to a power source;
   a service unit coupled to a network to receive a high-speed data stream from the network, the service unit configured to transmit data from the high-speed data stream across a drop connection to the data unit;
   the data unit configured to provide a direct current (DC) voltage to the service unit over the drop connection;
   the service unit comprising a first sensor, the first sensor configured to measure a first parameter corresponding to current used by the service unit, the service unit configured to communicate the measured first parameter to the data unit;
   the data unit comprising a second sensor, the second sensor configured to measure a second parameter corresponding to current provided by the data unit; and
   the data unit configured to determine a system condition using the first parameter and the second parameter and generate a control signal in response to determining a system condition.

2. The system of claim 1, wherein:
   the first sensor comprises a first current detector, the first current detector configured to measure current used by the service unit;
   the second sensor comprises a second current detector, the second current detector configured to measure current provided by the data unit; and
   the data unit is configured to determine the system condition in response to the difference of the measured data unit current minus the measured service unit current being greater than a predetermined current value.

3. The system of claim 2, wherein:
   the determined system condition is one of a first system condition or a second system condition;
   the predetermined current value is one of a first predetermined current value or a second predetermined current value greater than the first predetermined current value;
   the first system condition is determined in response to the difference of the measured data unit current minus the measured service unit current being greater than the first predetermined current value;
   the first system condition corresponds to a telephone adapter device connecting a first telephone to the drop connection and the first telephone being in an off-hook state;
   the second system condition is determined in response to the difference of the measured data unit current minus the measured service unit current being greater than the second predetermined current value; and
   the second system condition corresponds to a second telephone being directly connected to the drop connection and the second telephone being in an off-hook state.

4. The system of claim 3, wherein:
   the data unit comprises a voice over internet protocol (VOIP) unit configured to process voice signals in the high-speed data stream transmitted on the drop connection; and
   the data unit is configured to send the control signal to the VOIP unit in response to the first system condition being detected.

5. The system of claim 3, wherein:
   the data unit comprises a power supply configured to receive AC power from the power source and convert the AC power to the DC voltage; and
   the data unit is configured to send the control signal to the power supply in response to the second system condition being detected; and
   the power supply is configured to stop providing the predetermined DC voltage on the drop connection in response to receiving the control signal from the data unit.

6. The system of claim 5, wherein:
   the predetermined DC voltage is a first predetermined DC voltage;
   the power supply is configured to provide a second predetermined DC voltage less than the first predetermined DC voltage on the drop connection in response to a predetermined time delay elapsing after the detection of the second system condition; and
   the data unit is configured to determine a third system condition in response to the measured data unit current being less than a third predetermined current value.

7. The system of claim 6, wherein the power supply is configured to provide the first predetermined DC voltage on the drop connection in response to the third system condition being detected.

8. The system of claim 7, wherein:
   the data unit is configured to determine a fourth system condition in response to the measured data unit current being greater than the third predetermined current value; and
   the power supply is configured to stop providing the second predetermined DC voltage on the drop connection in response to the fourth system condition being detected.

9. The system of claim 6, wherein the service unit is configured to draw less than 1 mA in response to the power supply providing the second predetermined DC voltage on the drop connection.

10. The system of claim 6, further comprising a switch module coupled to the service unit, the drop connection and to a plain old telephone system (POTS) line for carrying POTS signals, the switch module configured to electrically connect the POTS line to the drop connection in a first state and to electrically connect the service unit to the drop connection in a second state, wherein the power supply is configured to provide the second predetermined DC voltage on the drop connection in response to the switch module being switched into the second state from the first state and prior to providing the first predetermined DC voltage on the drop connection.

11. The system of claim 10, wherein the service unit comprises a non-linear inductor, the non-linear inductor configured to decrease in inductance in response to an increase in voltage received by the non-linear inductor.

12. The system of claim 11, wherein the service unit comprises:
a bridge rectifier connected between the drop connection and the non-linear inductor; and
a capacitor connected to the non-linear inductor, the capacitor configured to increase a stored charge in response to a decrease in inductance in the non-linear inductor.

13. A method of determining system conditions in a telecommunication system, the method comprising:
connecting a data unit located at a customer premises to a distribution point located outside of the customer premises with a drop connection;
receiving, at the data unit, a high-speed data stream from the distribution point over the drop connection;
providing a DC voltage from the data unit over the drop connection to one or more components of the distribution point;
measuring a first parameter corresponding to current used by the distribution point;
transmitting the measured first parameter to the data unit over the drop connection;
measuring a second parameter corresponding to current provided by the data unit;
comparing the measured first parameter and the measured second parameter;
determining a system condition based on the comparison of the measured first parameter and the measured second parameter; and
generating a control signal in response to the determination of a system condition.

14. The method of claim 13, wherein:
said comparing the measured first parameter and the measured second parameter includes calculating a difference between the measured second parameter and the measured first parameter; and
said determining a system condition includes determining a system condition in response to the difference between the measured second parameter and the measured first parameter being greater than a predetermined value.

15. The method of claim 14, further comprising:
connecting a telephone to the drop connection; and
said determining a system condition in response to the difference between the measured second parameter and the measured first parameter being greater than a predetermined value includes determining an off-hook state for the telephone in response to the measured second parameter and the measured first parameter being greater than the predetermined value.

16. The method of claim 15, further comprising:
connecting a telephone adapter device between the telephone and the drop connection; and
said generating a control signal includes sending the control signal to a voice over internet protocol (VOIP) unit in the data unit in response to an off-hook state being detected, the VOIP unit configured to process voice signals in the high-speed data stream transmitted on the drop connection.

17. The method of claim 15, further comprising:
said providing a DC voltage includes connecting a power supply in the data unit to an AC power source, the power supply configured to receive the AC power from the AC power source and provide the DC voltage on the drop connection;
said generating a control signal includes sending the control signal to the power supply in response to an off-hook state being detected; and
stopping the power supply from providing the DC voltage on the drop connection in response to receiving the control signal from the data unit.

18. The method of claim 17, further comprising:
the DC voltage provided by the power supply is a first DC voltage;
the predetermined value is a first predetermined value;
the system condition is a first system condition;
providing a second DC voltage less than the first DC voltage on the drop connection with the power supply in response to a predetermined time delay elapsing after receiving the control signal from the data unit;
determining a second system condition based on the measured second parameter being less than a second predetermined value; and
providing the first DC voltage on the drop connection with the power supply in response to the second system condition being detected.

19. A data unit located at a customer premises, the data unit comprising:
a power supply coupled to a power source to receive power from the power source;
a control unit coupled to a drop connection to receive a high-speed data stream from a service unit connected to a network;
the power supply configured to provide a DC voltage to the service unit over the drop connection;
a current detector configured to measure a first parameter indicative of a current provided by the power supply;
the control unit configured to receive a second parameter measured by the service unit; and
the control unit configured to control DC voltage provided to the service unit based on the first and second parameters.

20. The data unit of claim 19, wherein the power supply is configured to stop providing the DC voltage to the service unit over the drop connection in response based on the first and second parameters.

21. A method, comprising:
receiving a high-speed data stream from a drop connection that connects a data unit at a customer premises to a service unit coupled to a network;
providing a DC voltage from a power supply at the customer premises over the drop connection to the service unit;
powering components of the service unit based on the DC voltage;
determining a first parameter indicative of an amount of current associated with the DC voltage at the current premises;
receiving from the service unit a second parameter indicative of an amount of current associated with the DC voltage at the service unit; and
controlling the DC voltage provided from the data unit over the drop connection to the service unit based on the first and second parameters.

22. The method of claim 20, further comprising comparing the first and second parameters, wherein the controlling is based on the comparing.

23. The method of claim 21, wherein the comparing is indicative of whether a current limiting circuit is coupled between a telephone at the customer premises and the power source.

* * * * *